United States Patent
Antao et al.

(10) Patent No.: US 10,650,078 B2
(45) Date of Patent: May 12, 2020

(54) REDUCING LATENCY IN RENDERING OF CONTENT

(71) Applicant: Adobe Inc., San Jose, CA (US)

(72) Inventors: Charles Peter Antao, Bangalore (IN); Anant Bhushan, Bangalore (IN); Neha Singhal, Greater Noida (IN); Pradeep R Revankar, Bangalore (IN); Harshit Jain, Bangalore (IN)

(73) Assignee: Adobe Inc., San Jose, CA (US)

( * ) Notice: Subject to any disclaimer, the term of this patent is extended or adjusted under 35 U.S.C. 154(b) by 193 days.

(21) Appl. No.: 15/715,650

(22) Filed: Sep. 26, 2017

(65) Prior Publication Data

US 2019/0095540 A1   Mar. 28, 2019

(51) Int. Cl.
| | | |
|---|---|---|
| *G06F 17/30* | (2006.01) | |
| *G06F 16/958* | (2019.01) | |
| *G06F 16/957* | (2019.01) | |
| *H04L 29/06* | (2006.01) | |

(52) U.S. Cl.
CPC .......... *G06F 16/972* (2019.01); *G06F 16/958* (2019.01); *G06F 16/9574* (2019.01); *G06F 16/9577* (2019.01); *H04L 65/602* (2013.01); *H04L 65/607* (2013.01); *H04L 65/80* (2013.01); *H04L 65/60* (2013.01); *H04L 69/02* (2013.01)

(58) Field of Classification Search
CPC .. G06F 16/958; G06F 16/972; G06F 16/9574; G06F 16/9577; H04L 65/602; H04L 65/80; H04L 65/607; H04L 69/02; H04L 65/60
See application file for complete search history.

(56) References Cited

U.S. PATENT DOCUMENTS

| | | | | |
|---|---|---|---|---|
| 9,503,280 | B2 * | 11/2016 | Jhingan | G06Q 10/107 |
| 2007/0253678 | A1 * | 11/2007 | Sarukkai | G11B 27/28 386/241 |
| 2009/0300202 | A1 * | 12/2009 | Hogan | H04N 7/162 709/231 |
| 2010/0112935 | A1 * | 5/2010 | Minter | H04H 20/106 455/3.03 |
| 2010/0287292 | A1 * | 11/2010 | Meurlinger | G06F 16/958 709/230 |

(Continued)

OTHER PUBLICATIONS

Minguillón et al., "JPEG standard uniform quantization error modeling with applications to sequential and progressive operation modes", Electronic Imaging, ISSN:0737-6553, 10(2), pp. 475-485 (2001).

*Primary Examiner* — Oanh Duong
(74) *Attorney, Agent, or Firm* — Finch & Maloney PLLC

(57) ABSTRACT

Content rendering techniques are disclosed that reduce latency in rendering of content by extracting resource intensive content from the content. An example method may include identifying items of resource intensive content included in an item of original content, and extracting the items of resource intensive content from the item of original content. The extracted items of resource intensive content are replaced with corresponding extraction markers in the item of original content to create an item of modified content. At the time of rendering the item of modified content, the extracted items of resource intensive content may be retrieved and appropriately inserted into the item of modified content to recreate the item of original content.

20 Claims, 4 Drawing Sheets

(56) References Cited

U.S. PATENT DOCUMENTS

| | | | | |
|---|---|---|---|---|
| 2012/0284290 A1* | 11/2012 | Keebler | | G06F 16/958 707/756 |
| 2013/0132833 A1* | 5/2013 | White | | G06F 3/048 715/704 |
| 2013/0246567 A1* | 9/2013 | Green | | H04L 67/06 709/217 |
| 2013/0268490 A1* | 10/2013 | Keebler | | G06F 16/954 707/627 |
| 2014/0359081 A1* | 12/2014 | Van Deventer | | H04N 21/6587 709/219 |
| 2015/0206169 A1* | 7/2015 | Ye | | G06Q 30/0242 705/14.41 |
| 2015/0220539 A1* | 8/2015 | Lambert | | G06F 16/355 707/723 |
| 2016/0042497 A1* | 2/2016 | Gopalakrishnan | | G06T 3/4092 715/252 |
| 2016/0247204 A1* | 8/2016 | Amiri | | G06F 16/958 |
| 2016/0285941 A1* | 9/2016 | Xie | | H04L 65/602 |
| 2016/0286027 A1* | 9/2016 | Lee | | H04M 1/72552 |
| 2017/0078718 A1* | 3/2017 | Ioffe | | H04N 21/23439 |
| 2017/0111412 A1* | 4/2017 | Rogers | | H04L 65/4069 |
| 2017/0131967 A1* | 5/2017 | Nieuwenhuys | | H04L 65/1083 |
| 2017/0180446 A1* | 6/2017 | Thomas | | H04L 43/0888 |
| 2017/0195373 A1* | 7/2017 | Toh | | H04L 65/1089 |
| 2018/0034884 A1* | 2/2018 | Niuwenhuys | | H04L 65/607 |
| 2018/0041561 A1* | 2/2018 | Davies | | H04L 65/4076 |
| 2018/0070118 A1* | 3/2018 | Swaminathan | | H04N 21/25435 |
| 2018/0137596 A1* | 5/2018 | Chenu | | B61L 15/0027 |
| 2018/0218399 A1* | 8/2018 | Rajaram | | G06Q 30/0255 |
| 2018/0268556 A1* | 9/2018 | Karavadi | | G06T 7/246 |
| 2018/0270492 A1* | 9/2018 | Larumbe | | H04N 19/40 |
| 2018/0357562 A1* | 12/2018 | Hofman | | G06N 5/022 |
| 2018/0367868 A1* | 12/2018 | Banger | | H04N 21/812 |
| 2019/0043094 A1* | 2/2019 | Litvak | | G06Q 30/0276 |
| 2019/0260969 A1* | 8/2019 | Tzoukermann | | H04N 7/17318 |

* cited by examiner

REDUCING LATENCY IN RENDERING OF CONTENT

FIELD OF THE DISCLOSURE

This disclosure relates generally to distribution of content, and more particularly, to techniques for reducing the initial render time of content.

BACKGROUND

Web content increasingly integrates different types of content such as text, images, video, and audio, to name a few. Integration of the various types of content contributes to both the dynamic nature of the content and the increased size of the content. However, for large content, network latency may cause a web browser application program that is receiving the large content to become unresponsive. This is primarily due to the application program needing to receive the entire content before it can render the content.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
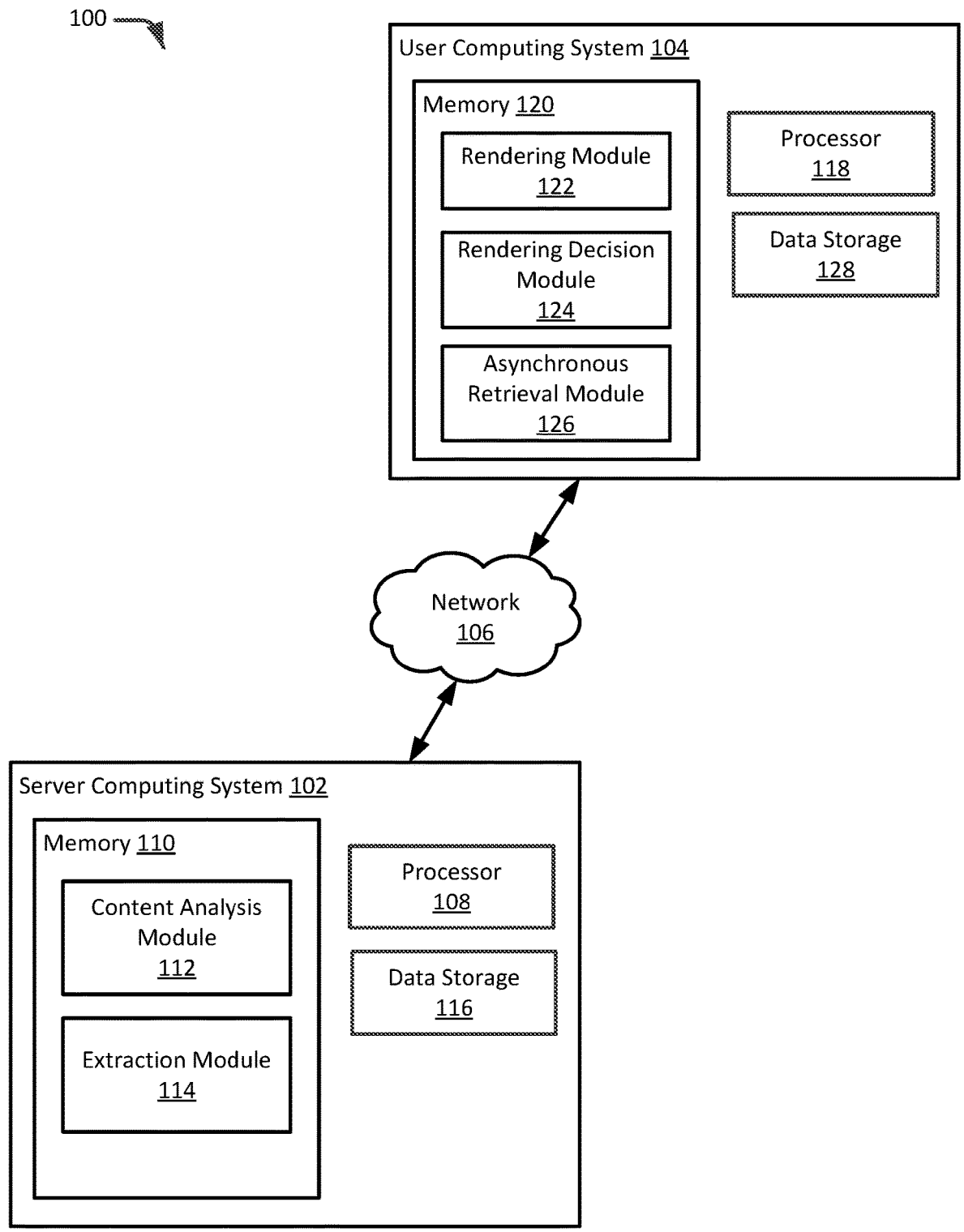
FIG. 1 illustrates an example client-server content distribution system, in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

As discussed above, network latency may cause a client application (e.g., a web browser application program) that is receiving and rendering large content to become unresponsive. This typically leads to poor user experience in that the user will be dissatisfied in having to wait for the content to be rendered. Some approaches to increasing the responsiveness of client applications have involved adding additional layers of caching, for example, on the application server that is serving the content, and on the client on which the client application that is receiving the content is running. However, increasing the caching does not help in reducing the latency encountered in the transmission of the large content, especially when the content size may be significant. Other approaches to increasing responsiveness have involved including a Uniform Resource Locator (URL) for the content in the encoded data stream instead of the content itself. For example, for content that includes a large image, including a URL of the image in the encoded data stream may significantly reduce the size of the data stream that needs to be transmitted. Unfortunately, this approach is not suited for transmission of access controlled content in that the URL is transmitted in the "open". Anyone having knowledge of the URL, even an unscrupulous actor, can access the content that is addressed by the URL, thus no longer making the content access controlled. Other approaches involve breaking up the large content into a series of multiple segments, and separately transmitting the multiple segments. This is similar to how streaming video is served. However, this may not be suitable for dynamically generated content as the client application would need to know in advance how to process (e.g., what calls to make to process the content, how many calls to make, when to make the calls, etc.) the broken-up, dynamically generated content. For example, content that includes one image and content that includes five images cannot be processed ("handled") in a generic manner.

To this end, techniques are disclosed for increasing the responsiveness of client applications that receive and render content by reducing the size of an encoded data stream that is needed to transmit the content. The reduced size of the encoded data stream needed to transmit the content allows for faster reception of the content by the client application, thus allowing the client application to reduce the initial render time of the content. For example, a content author may author or create original content for distribution to intended recipients. The original content may be analyzed to identify resource intensive content that is included in the original content. The identified resource intensive content may be extracted from the original content, and each extracted item of resource intensive content may be replaced with an extraction marker in the original content to create a modified content. The modified content corresponds to the original content authored by the content author, but without the extracted items of resource intensive content. Each extraction marker identifies the respective extracted item of resource intensive content, and indicates to the client application that is rendering the modified content that resource intensive content has been extracted from the original content. Replacing an item of resource intensive content with several bytes of data that represents the extraction marker can greatly reduce the size of the modified content (size of the encoded data stream of the modified content) when compared to the size of the corresponding original content (size of the encoded data stream of the original content). The much smaller modified content, when compared with the corresponding original content, is transmitted to the client application instead of the corresponding original content.

Transmission of the smaller modified content allows the client application to start rendering the corresponding original content much sooner than if the larger original content is transmitted. That is, the client application can start the rendering of the modified content (i.e., rendering of the original content less the extracted items of resource intensive content) once the smaller modified content is received without having to wait for the extracted items of resource intensive content. Contemporaneous with the rendering of the modified content, the client application may retrieve the extracted items of resource intensive content, and recreate the original content that corresponds to the modified content. For example, the client application can insert each retrieved item of resource intensive content into the appropriate location in the modified content (the encoded data stream used to transmit the modified content) to recreate the original content.

In some embodiments, the extraction marker includes a globally unique identifier (GUID) and associated metadata. The GUID uniquely identifies the extracted item of resource intensive content, and the associated metadata serves as an indicator that an item of content has been extracted. In some embodiments, the metadata may indicate one or more characteristics of the extracted item of resource intensive content. Examples of characteristics include a type of content that was extracted (e.g., the type of content the extracted item of resource intensive content identified by the associated GUID is), a size of the extracted item of resource intensive content (e.g., the number of bytes in the encoding of the extracted item of resource intensive content), and a dimension in the case of the extracted item of resource intensive content being an image, to name a few examples.

In some embodiments, extraction of resource intensive content may be based on one or more extraction criteria, such as a size threshold, a usage threshold, and the like. An item of resource intensive content that satisfies the extraction criteria is extracted from the original content, whereas an item of resource intensive content that does not satisfy the extraction criteria is not extracted from the original content. For example, a size threshold may indicate a size for an item of resource intensive content to be extracted from the original content. An item of resource intensive content whose size (e.g., a number of bytes to encode the item of resource intensive content) satisfies (i.e., size is equal to or larger than) a specified size threshold is extracted from the original content, whereas an item of resource intensive content that does not satisfy (i.e., size is smaller than) the specified size threshold is not extracted from the original content. Different size thresholds may be specified for different types of content. For example, a image size threshold may be specified for images, and another text data size threshold may be specified for text data. In the case of text data, the specified text data size threshold may apply to extended text, where extended text includes text that extends beyond or exceeds the current size of the display screen on which the text is being displayed on. In some embodiments, the specified text data size threshold may vary depending on the size of the display screen associated with the computing device the client application is running on.

Additionally or alternatively, a usage threshold may indicate a usage threshold for an item of resource intensive content to be extracted from the original content. An item of resource intensive content whose measured usage metric satisfies (i.e., usage metric is equal to or smaller than) the specified usage threshold is extracted from the original content, whereas an item of resource intensive content that does not satisfy (i.e., usage metric is larger than) the specified usage threshold is not extracted from the original content. For example, suppose collected analytics metrics indicate that 20% of users that were provided original content that included a particular image actually viewed the image, and that the specified usage threshold for the particular image is 50%. In this case, if the same image is included in an item of original content, the image will be extracted from the original content since the measured usage metric for the image satisfies the specified usage threshold (the measured usage metric of 20% is smaller than the specified usage threshold of 50%). If, on the other hand, the collected analytics metrics indicate that 55% of the users that were provided original content that included the particular image actually viewed the image, the particular image will not be extracted from an item of original content that includes this image since the measured usage metric for the image does not satisfy the specified usage threshold (the measured usage metric of 55% is larger than the specified usage threshold of 50%). As another example, suppose the collected analytics metrics indicate that 40% of the users that were provided original content that included three pages of text data (e.g., pages 1, 2, and 3 of a specific item of text data) actually viewed page 3 of the text data, and that the specified usage threshold for page 3 of the specific item of text data is 50%. In this case, if the specific item of text data is included in an item of original content, page 3 of the specific item of text data will be extracted from the item of original content since the measured usage metric for page 3 of the text data satisfies the specified usage threshold for page 3 of the text data (the measured usage metric of 40% is smaller than the specified usage threshold of 50%).

In some embodiments, the content may be access controlled content. For example, a content author may create access controlled original content by authoring original content and attaching access controls to the original content. The attached access controls may specify the recipient or recipients authorized to access the access controlled original content. In the case of access controlled content, the same access controls that are attached to an item of access controlled content may be attached to the items of resource intensive content extracted from the item of access controlled content. This allows the extracted items of resource intensive content to also be access controlled in the same manner as the item of access controlled content from which the items of resource intensive content were extracted.

As used herein, the term "content" refers, in addition to its ordinary meaning, to information and experiences that are directed towards an intended audience. The information can be provided through a medium, such as the Internet. The content can also refer to the manner in which the information is presented.

As used herein, the term "original content" refers, in addition to its ordinary meaning, to content that is created by a content author, before any modification to the content by someone or something other than the content author that created the original content. Original content may be content that is informative, engaging, helpful, and/or entertaining. Original content may include information that the author of the original content considers informative, engaging, helpful, and/or entertaining to the recipient(s) of the original content. Original content may include mixed content.

As used herein, the term "mixed content" refers, in addition to its ordinary meaning, to content that integrates different types of content types, such as text, images, graphics, video, sound, links (e.g., links to web sites), embedded programs (e.g., ActiveX controls), and any other information that may be visualized, for example, on a web page, an application graphical user interface (GUI), or any suitable computing output device. Mixed content may include web content.

As used herein, the term "resource intensive content" refers, in addition to its ordinary meaning, to content whose data encoding (e.g., encoded data) is excessively large, and the transmission of the data encoding to a client application may cause an excessive delay in the receipt and/or rendering of the content by the client application. The delay in the receipt and or rendering of the content by the client application results in poor user experience in that a user of the client application will be dissatisfied in having to wait for the content to be received and rendered. The resource intensive content may be included in and be a part of other content, such as original content. Moreover, an item of original content may include one or more items of resource intensive content. One example of resource intensive content is images in that an encoding of an image may be very large (e.g., 1 MB or more). Another example of resource intensive content is large amounts of text data (e.g., large numbers of pages of text).

As used herein, the term "modified content" refers, in addition to its ordinary meaning, to original content that has been modified to remove one or more items of resource intensive content. In the place of each extracted item of resource intensive content, the modified content includes an extraction marker that identifies the respective extracted item of resource intensive content, and which serves to indicate that content has been extracted and is missing from the modified content.

As used herein, the term "access controlled content" refers, in addition to its ordinary meaning, to content whose access is selectively restricted. The access controlled content is provided to those who are authorized access to the access controlled content based on an access control policy. For example, an access control policy for Content A may specify that Content A is to be provided only to those with credentials (e.g., username and password) c, d, and g. Similarly, an access control policy for Content B may specify that Content B is to be provided only to those with credentials y and z. In this example, a user that provides credential d will be authorized access to Content A (e.g., Content A may be provided to this user), but not authorized access to Content B. Conversely, a user that provides credential z will be authorized access to Content B (e.g., Content B may be provided to this user), but not authorized access to Content A. The transmission (e.g., delivery) of the access controlled content is via transmission of an encoded data stream that represents the access controlled content. Interpretation of the encoded data stream as text (e.g., text characters) does not reveal or expose the access controlled content that the encoded data stream represents.

As used herein, the term "access controlled original content" refers, in addition to its ordinary meaning, to original content that is access controlled.

System Architecture

Turning now to the figures, FIG. 1 illustrates an example client-server content distribution system 100, in accordance with at least some embodiments described herein. System 100 includes a server computing system 102 communicatively coupled to a user computing system 104 via a network 106. Network 106 can be a local area network, a wide area network, the Internet, and/or other wired or wireless networks. Server computing system 102 may be a server that provides various services, including the providing of content, to clients, such as user computing system 104. User computing system 104 may be a client that obtains various services, including the provided content, offered by servers, such as server computing system 102.

As depicted, server computing system 102 includes a processor 108, memory 110, which further includes a content analysis module 112 and an extraction module 114, and a data store 116. Processor 108, memory 110, and data storage 116 may be communicatively coupled. User computing system 104 includes a processor 118, a memory 120, which further includes a rendering module 122, a rendering decision module 124, and an asynchronous retrieval module 126, and a data storage 128. Processor 118, memory 120, and data storage 128 may be communicatively coupled. In various embodiments, additional components (not illustrated, such as network interface modules, displays, user input devices, etc.) or a subset of the illustrated components can be employed without deviating from the scope of the present disclosure. For instance, other embodiments may integrate the various functionalities of modules 112 and 114, or modules 122, 124, and 126, into fewer modules (e.g., one or two) or more modules (e.g., five or ten, or more). In addition, further note that the various components of system 102 and system 104 may all be in a stand-alone computing system according to some embodiments, while in others, may be distributed across additional machines. In some cases, one or more of modules 112 and 114 may be downloaded from server computing system 102 into a browser (or other application) of user computing system 104 for local execution, for example, along with modules 122, 124, and 126. In some cases, server computing system 102 may provide modules 122, 124, and 126 to user computing system 104. In a more general sense, the degree of integration and distribution of the functional component(s) provided herein can vary greatly from one embodiment to the next, as will be appreciated in light of this disclosure.

Server computing system 102 and user computing system 104 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure.

Content analysis module 112 is configured to analyze items of original content, and for each item of original content, identify items of resource intensive content included in the item of original content. Content analysis module 112 is configured to determine whether the identified items of resource intensive content are to be extracted from the item of original content. Content analysis module 112 can base the determination as to whether an identified item of resource intensive content is to be extracted from the item of original content on one or more extraction criteria, such as a size threshold, a usage threshold, and the like. For each item of resource intensive content that is to be extracted from the item of original content, content analysis module 112 can create an extraction marker to indicate that an item of resource intensive content is to be extracted.

Extraction module 114 is configured to extract from each item of original content the items of resource intensive content based on the extraction markers created by content analysis module 112. Extraction module 114 creates a child content from each item of extracted resource intensive content. Extraction module 114 is configured to replace each extracted item of resource intensive content with the corresponding extraction marker in the item of original content to create a modified content. In some embodiments, the extraction marker is inserted in a location within the item of original content from which the corresponding item of resource intensive content (the item of resource intensive content identified by the extraction marker) was extracted. In some embodiments, each item of child content may have attached thereto the same access controls as the access controls that are attached to the original content from which the child content was extracted. For example, suppose access control A is attached to an item of original content. In this instance, access control A will also be attached to the child contents created from items of resource intensive content extracted from the item of original content. In this manner, the child content is access controlled in the same manner as the access controlled original content from which the child content is created from.

Rendering module 122 is configured to work in conjunction with rendering decision module 124 and asynchronous retrieval module 126 to render content for viewing by a user. Rendering module 122 may provide an interface, such as a graphical user interface (GUI) with which a user can access server computing system 102 and access original contents provided by server computing system 102. In some cases, rendering module 122, rendering decision module 124, and asynchronous retrieval module 126 may be provided by server computing system 102 for execution and use on user computing system 104 by the user.

Rendering decision module 124 is configured to retrieve items of modified content from server computing system 102. Once an item of modified content is received, rendering decision module 124 analyzes the item of modified content to determine whether the modified content includes extraction markers. Rendering decision module 124 can flag each extraction marker included in the item of modified content for retrieval. In some embodiments, rendering decision module 124 is configured to determine whether or not child content associated with (identified by) each extraction marker is to be retrieved from server computing system 102. Rendering decision module 124 can base the determination as to whether an item of child content is to be retrieved on a retrieval criterion, such as whether the retrieved child content will be visible if displayed on a display screen of user computing system 104. Rendering decision module 124 can also base the determination as to whether an item of child content is to be retrieved on an analytic metric associated with the item of child content, such as the size of the child content, speed of the data connection between user computing system 104 and server computing system 102, a usage metric, etc.

Asynchronous retrieval module 126 is configured to retrieve child contents from server computing system 102 based on the extraction markers flagged for retrieval by rendering decision module 124. For each item of child content retrieved from computing system 102, asynchronous retrieval module 126 inserts the item of child content into the item of modified content. The item of original content corresponding to the modified content is recreated once all the items of child contents extracted from the item of original content are appropriately inserted into the modified content. For example, asynchronous retrieval module 126 replaces the extraction marker in the item of modified content with the corresponding item of child content (the item of child content identified by the extraction marker) to recreate the item of original content. In some embodiments, asynchronous retrieval module 126 is configured to collect data such as the frequency or rate with which each item of child content is being loaded for rendering to the user (e.g., a usage metric), as well as other analytic metrics regarding the child contents.

Processor 108 and processor 118 may include any suitable special-purpose or general-purpose computer, computing entity, or computing or processing device including various computer hardware, firmware, or software modules, and may be configured to execute instructions, such as program instructions, stored on any applicable computer-readable storage media. For example, each of processor 108 and processor 118 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 1, each of processor 108 and processor 118 may include any number of processors and/or processor cores configured to, individually or collectively, perform or direct performance of any number of operations described in the present disclosure. Additionally, one or more of the processors may be present on one or more different electronic devices, such as different servers and/or clients.

In some embodiments, processor 108 may be configured to interpret and/or execute program instructions and/or process data stored in memory 110, data storage 116, or memory 110 and data storage 116. In some embodiments, processor 108 may fetch program instructions from data storage 116 and load the program instructions in memory 110. After the program instructions are loaded into memory 110, processor 108 may execute the program instructions. Similarly, processor 118 may be configured to interpret and/or execute program instructions and/or process data stored in memory 120, data storage 128, or memory 120 and data storage 128. In some embodiments, processor 120 may fetch program instructions from data storage 128 and load the program instructions in memory 120. After the program instructions are loaded into memory 120, processor 118 may execute the program instructions.

For example, in some embodiments, any one or more of the components and/or modules of server computing system 102 may be included in data storage 116 as program instructions. Processor 108 may fetch some or all of the program instructions from data storage 116 and may load the fetched program instructions in memory 110. Subsequent to loading the program instructions into memory 110, processor 102 may execute the program instructions such that the computing system may implement the operations as directed by the instructions. In one example case, for instance, each of modules 112 and 114 is loaded in memory 110 and executable by processor 108. Similarly, in some embodiments, any one or more of the components and/or modules of user computing system 104 may be included in data storage 128 as program instructions. Processor 118 may fetch some or all of the program instructions from data storage 128 and may load the fetched program instructions in memory 120. Subsequent to loading the program instructions into memory 120, processor 118 may execute the program instructions such that the computing system may implement the operations as directed by the instructions. In one example case, for instance, each of modules 122, 124, and 126 is loaded in memory 120 and executable by processor 118.

In some embodiments, virtualization may be employed in server computing system 102 and/or user computing system 104 so that infrastructure and resources in server computing system 102 and/or user computing system 104 may be shared dynamically. For example, a virtual machine may be provided to handle a process running on multiple processors so that the process appears to be using only one computing resource rather than multiple computing resources. Multiple virtual machines may also be used with one processor.

Memory 110 and data storage 116, and memory 120 and data storage 128 may include computer-readable storage media for carrying or having computer-executable instructions or data structures stored thereon. Such computer-readable storage media may include any available media that may be accessed by a general-purpose or special-purpose computer, such as processor 108 and processor 118, respectively. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 108 and processor 118 to perform a certain operation or group of operations.

As an example, server computing system 102 may represent an Adobe web server that provides pre-release product information regarding the Adobe Photoshop® product. Certain members of the Adobe Photoshop® product team may author original content for distribution to interested users regarding an upcoming release of the Photoshop® product. The authored original content may be mixed content that includes text data, two images, and a video. When the original content is authored by the product team, the original content may be provided on server computing system 102. Once the original content is provided on server computing system 102 and prior to providing the original content to the interested users, server computing system 102 processes the original content to identify and remove items of resource intensive content that are included in the original content. In the example of the original content being mixed content that includes text data, two images, and the video, the server computing system 102 can identify and extract the two images and the video from the original content. The server computing system 102 can replace the extracted two images and video in the original content with corresponding extraction markers to create a modified content. Server computing system 102 can then provide the modified content regarding the upcoming release of the Photoshop® product for consumption by the interested users. For example, a user can employ user computing system 104 to connect to server computing system 102 and access the information regarding the upcoming release of the Photoshop® product. For example, the user can activate a link or some other suitable activation mechanism provided on user computing system 104 to request the information regarding the upcoming release of the Photoshop® product. In response, server computing system 102 can provide the modified content regarding the upcoming release of the Photoshop® product to user computing system 104. Upon receiving the modified content regarding the upcoming release of the Photoshop® product, user computing system 104 can render the modified content for viewing by the user without waiting to receive the extracted two images and the extracted video. Rather, contemporaneous with or subsequent to rendering the modified content, user computing system 104 uses the extraction markers from the modified content to retrieve the extracted two images and the extracted video. User computing system 104 can then insert the two images and the video in their respective locations in the modified content to recreate the original content on user computing system 104. User computing system 104 can then continue to render the original content for viewing by the user.

In some embodiments, the original content is access controlled (access controlled original content) for access by selected users. In the Adobe Photoshop® example above, the selected users may be provided credentials, such as usernames and passwords, for use in accessing the access controlled original content. A user can then employ user computing system 104 to provide the previously provided credentials to server computing system 102. Server computing system 102 can then authenticate the user as an authorized user, and provide the user access to a client application, such as a web client application, for execution on user computing system 104, and with which the user can access the information regarding the upcoming release of the Photoshop® product, as described in the example above. For example, a user may utilize a browser running on user computing system 104 to provide appropriate credentials to server computing system 102. Once server computing system 102 authorizes the user based on the provided credentials (e.g., user successfully logs into server computing system 102), server computing system 102 can provide rendering module 122, rendering decision module 124, and asynchronous retrieval module 126 for execution in the browser running on user computing system 104.

While various aspects and embodiments of server computing system 102, including processor 108, memory 110, content analysis module 112, extraction module 114, and data storage 116, and user computing system 104, including processor 118, memory 120, rendering module 122, rendering decision module 124, asynchronous retrieval module 126, and data storage 128 have been described above with reference to FIG. 1, other aspects and embodiments will be apparent to those skilled in the art. For example, those skilled in the art will appreciate that some or all of the operations of or functions performed by one module of server computing system 102 or user computing system 104 as described above may be performed by one or more other modules of server computing system 102 or user computing system 104. Furthermore, the described operations and functions are only provided as examples, and some of the steps and operations and functions may be optional, combined into fewer operations and functions, or expanded into additional operations and functions without detracting from the scope of the present disclosure.

Figure 2:
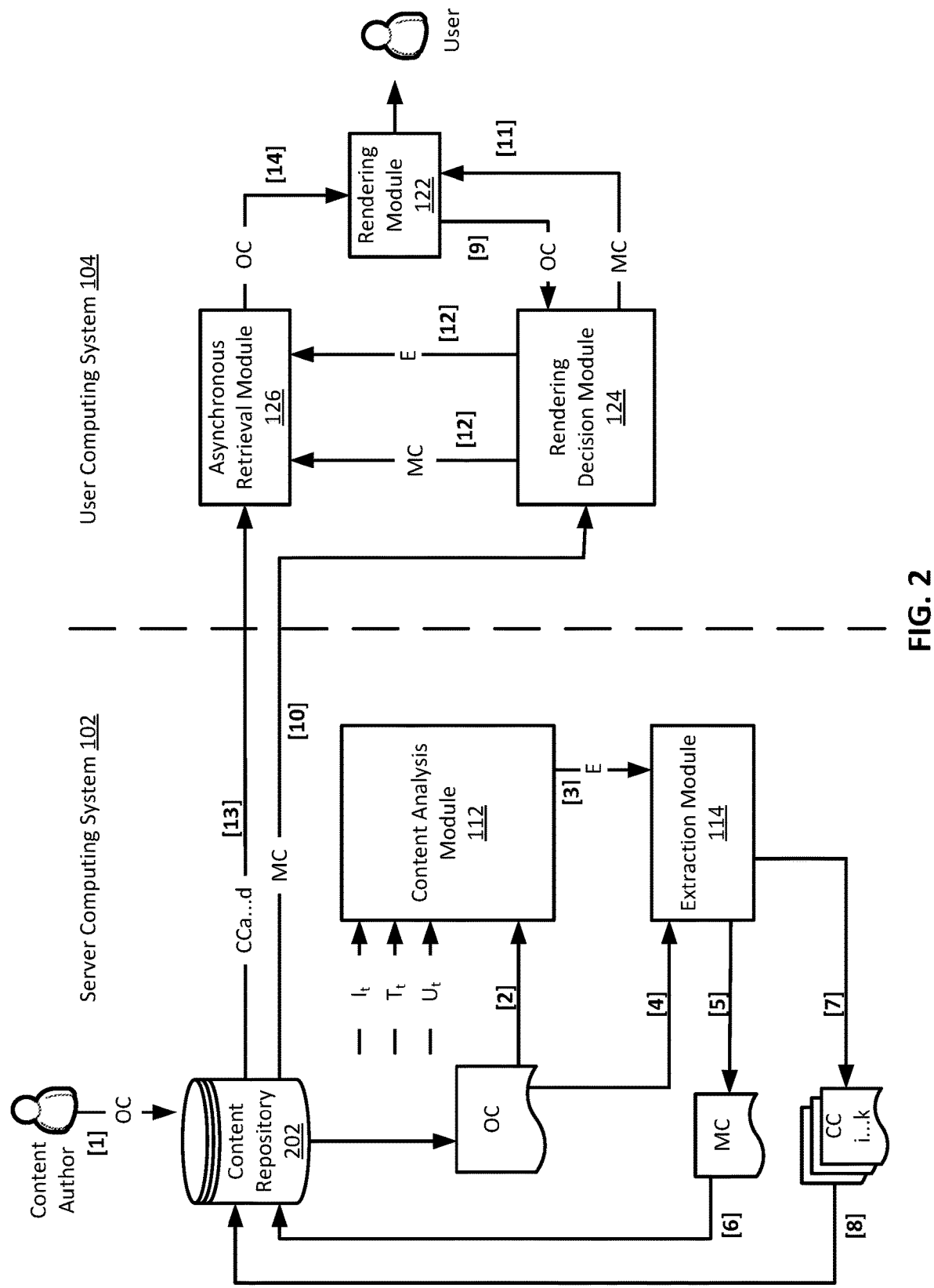
FIG. 2 illustrates example interactions between selected components of the example client-server system to reduce latency in rendering of content, in accordance with at least some embodiments described herein.

FIG. 2 illustrates example interactions between selected components of example client-server system 100 to reduce latency in rendering of content, in accordance with at least some embodiments described herein. A content author may have access to a device that facilitates interaction with server computing system 102. The content author uses the device to author an item of original content (OC) and store the authored item of original content in a content repository 202 included in or otherwise accessible by server computing system 102 [1]. For example, content repository 202 may be implemented using or be included as part of data storage 116. Of course, the content author, or other content authors, can author additional items of original content and store the authored items of original content in content repository 202.

Content analysis module 112 may determine that a newly authored item of original content is stored in content repository 202. Content analysis module 112 can retrieve the item of original content (e.g., a copy of the item of original content) from content repository 202 and analyze the item of original content for resource intensive content included in the item of original content [2]. For every item of resource intensive content identified in the item of original content, content analysis module 112 creates a content extraction flag for the identified item of resource intensive content. An extraction marker serves as to identify a specific item of resource intensive content. The extraction marker may also include metadata (data) regarding specifics of the identified item of resource intensive content, such as content type (e.g., image, text data, video, etc.), size of the resource intensive content, dimensions in the instance the resource intensive content is a video, access controls associated with the resource intensive content, to name a few examples.

In some embodiments, content analysis module 112 determines whether an item of resource intensive content is to be extracted based on extraction criteria. For example, content analysis module 112 may be pre-configured with one or more of a size threshold for image data ($I_t$), a size threshold for text data ($T_t$), and a usage threshold ($U_t$). Content analysis module 112 can then use the thresholds to determine whether an item of resource intensive content is to be extracted. For example, in the case where the item of resource intensive content is an image, content analysis module 112 can create an extraction marker for the image, to indicate that the image is to be extracted, if the size of the image (size of the encoded data) satisfies the size threshold, $I_t$. If the size of the image does not satisfy the size threshold, $I_t$, content analysis module 112 does not create an extraction marker for the image, in which case the image is not extracted and remains in the original content. That is, although the image is identified as an item of resource intensive content, the image (resource intensive content) is not identified to be extracted from the item of original content since the impact on the rendering of the item of original content as a result of the image (e.g., small size of the encoded data) remaining in the item of original content is expected to be minimal. As another example, in the case where the item of resource intensive content is text data, content analysis module 112 can create an extraction marker for the text data, to indicate that the text data is to be extracted, if the size of the text data (size of the encoded data) satisfies the size threshold, $T_t$. In some embodiments, the text data in excess of the size threshold, $T_t$, is identified for extraction in the item of resource intensive content. For example, suppose the size of the text data is 4 MB, and the size threshold, $T_t$, is 1 MB. In this case, content analysis module 112 creates an extraction marker for the last 3 MB of text data to indicate that the last 3 MB of text data is to be extracted from the item of original content. Here, the first 1 MB of the text data is to remain in the item of original content. In some embodiments, content analysis module 112 can create multiple extraction markers for text data that is in excess of the size threshold, $T_t$. The creation of multiple extraction markers will result in the text data being extracted in smaller chunks, where the number of chunks is determined by the number of extraction markers. Taking the example above, content analysis module 112 can create multiple extraction markers for the last 3 MB of text data. The creation of multiple extraction markers will result in the last 3 MB of text data being extracted in multiple chunks, thus resulting in multiple items of child content. For example, the number of extraction markers may be based on criteria such as a number of pages of text data (e.g., one extraction marker for every 3, 5, 8, etc. pages of text), the number of chapters in the text data (e.g., one extraction marker for every chapter), the number of display screens expected to be needed to display the text data (e.g., one extraction marker for every 1, 2, 3, etc. display screens), to name a few examples. As still another example, in the case where the item of resource intensive content is a video, content analysis module 112 can create an extraction marker for the video in a manner similar to text data discussed in the example above. For example, if content analysis module 112 determines that the video is to be extracted, content analysis module 112 can create an extraction marker for the video to indicate that the video is to be extracted and, in some cases, create multiple extractions markers (e.g., based on playback times or time points—one extraction marker for every 5, 7, 10, etc. mins of playback time) for the video. In an example application of the usage threshold, $U_t$, content analysis module 112 can create an extraction marker for an item of resource intensive content, to indicate that the item of resource intensive content is to be extracted, if a measured usage metric for the item of resource intensive content satisfies (is equal to or smaller than) the usage threshold, $U_t$. If the measured usage metric for the item of resource intensive content does not satisfy (is larger than) the usage threshold, $U_t$, content analysis module 112 does not create an extraction marker for the image, in which case the item of resource intensive content is not extracted and remains in the original content. In some embodiments, content analysis module 112 can combine some or all of the thresholds in determining whether an item of resource intensive content is to be extracted. For example, content analysis module 112 can determine whether an item of resource intensive content is to be extracted based on both the size threshold ($I_t$ or $T_t$) and the usage threshold ($U_t$). In some embodiments, the threshold values may be configured, for example, by a system administrator.

Returning to the interactions as illustrated in FIG. 2, content analysis module 112 creates an extraction marker for each item of resource intensive content that is to be extracted from the item of original content. Content analysis module 112 then provides extraction module 114 the created extraction markers, E [3]. Content analysis module 112 can similarly process other items of original content, as necessary. When provided the extraction markers, E, for an item of original content, extraction module 112 retrieves the item of original content (e.g., a copy of the item of original content) from content repository 202 [4], and extracts from the item of original content the items of resource intensive content identified by the extraction markers. Extraction module 114 inserts the extraction markers into appropriate locations (locations where the corresponding items of resource intensive content were extracted) in the item of original content, less the extracted items of resource intensive content, to create an item of modified content (MC) [5]. Extraction module 114 then stores the created item of modified content in content repository 202 [6]. Extraction module 114 creates items of child content (CCi . . . k) from the extracted items of resource intensive content [7]. For example, one item of child content is created from one item of extracted resource intensive content. One or more child contents can be created from an item of original content based on the number of items of resource intensive content extracted from the item of original content. In the instance where the item of original content is access controlled, extraction module 114 attaches the access controls from the item of original content to each item of child content. Extraction module 114 then stores the created items of child content in content repository 202 [8]. Extraction module 114 can similarly process other extraction markers, associated with other items of original content, received from content analysis module 112.

A user may utilize user computing system 104 to connect to and access server computing system 102. When accessed, server computing system 102 may provide rendering module 122, rendering decision module 124, and asynchronous retrieval module 126 for execution on user computing system 104, to facilitate access to server computing system 102 by the user. By way of example, rendering module 112 may display on a display screen of user computing system 104 a list of original contents that are accessible by the user. The user can then select an item of original content (OC) from the list of original contents, which causes rendering module 122 to send rendering decision module 124 a request for the selected item of original content [9]. Rendering decision module 124 can then retrieve from content repository 202 the item of modified content (MC) that corresponds to the requested item of original content [10]. For example, the item of modified content may be retrieved (e.g., transmitted by server computing system 102) as an encoded data stream. In some embodiments, rendering decision module 124 can send a request for the item of original content, and server computing system 102 can return the item of modified content that corresponds to the requested item of original content. Rendering decision module 124 can then provide the retrieved item of modified content to rendering module 122 for rendering to the user [11]. Rendering the item of modified content instead of the requested item of original content reduces the latency in rendering the requested item of original content. The small size of the item of modified content, when compared to the size of the corresponding item of original content, allows rendering module 122 to start rendering of the item of modified content earlier than if the item of original content is to be rendered. Moreover, the rendered content (the item of modified content) is content that is included in the item of modified content. Thus, the user is able to view the content of the requested item of original content earlier than if the actual item of original content is being rendered.

Having provided the retrieved item of modified content to rendering module 122, rendering decision module 124 can analyze the item of modified content for the presence of extraction markers included in the item of modified content. Rendering decision module 124 can flag each extraction marker included in the item of modified content for retrieval, and provide the item of modified content (MC) and the extraction markers (E) to asynchronous retrieval module 126 for retrieval [12]. Asynchronous retrieval module 126 can then retrieve from content repository 202 the items of child content (indicated as CCa . . . d in FIG. 2) based on the extraction markers flagged for retrieval by rendering decision module 124 [13]. Asynchronous retrieval module 126 replaces the flagged extraction markers in the item of modified content with the corresponding item of child content to recreate the item of original content (the item of original content that corresponds to the item of modified content), and provides rendering module 122 the recreated item of original content (OC) for rendering to the user [14]. Having completed viewing the selected item of original content, the user can then select another item of original content or otherwise continue interacting with server computing system 102.

In some embodiments, rendering decision module 124 determines whether to flag an extraction marker based on retrieval criteria, such as whether the item of child content identified by the extraction marker will be visible if displayed on a display screen of user computing system 104, likelihood of the user viewing the child content identified by the extraction marker (for example, the likelihood may be determined based on the contents currently being displayed on a display screen of user computing system 104), an analytic metric associated with the item of child content identified by the extraction marker, to name a few examples. In these embodiments, rendering decision module 124 can selectively flag the extraction markers, and provide asynchronous retrieval module 126 the flagged extraction markers over multiple instances (e.g., upon flagging an extraction marker for retrieval).

Figure 3:
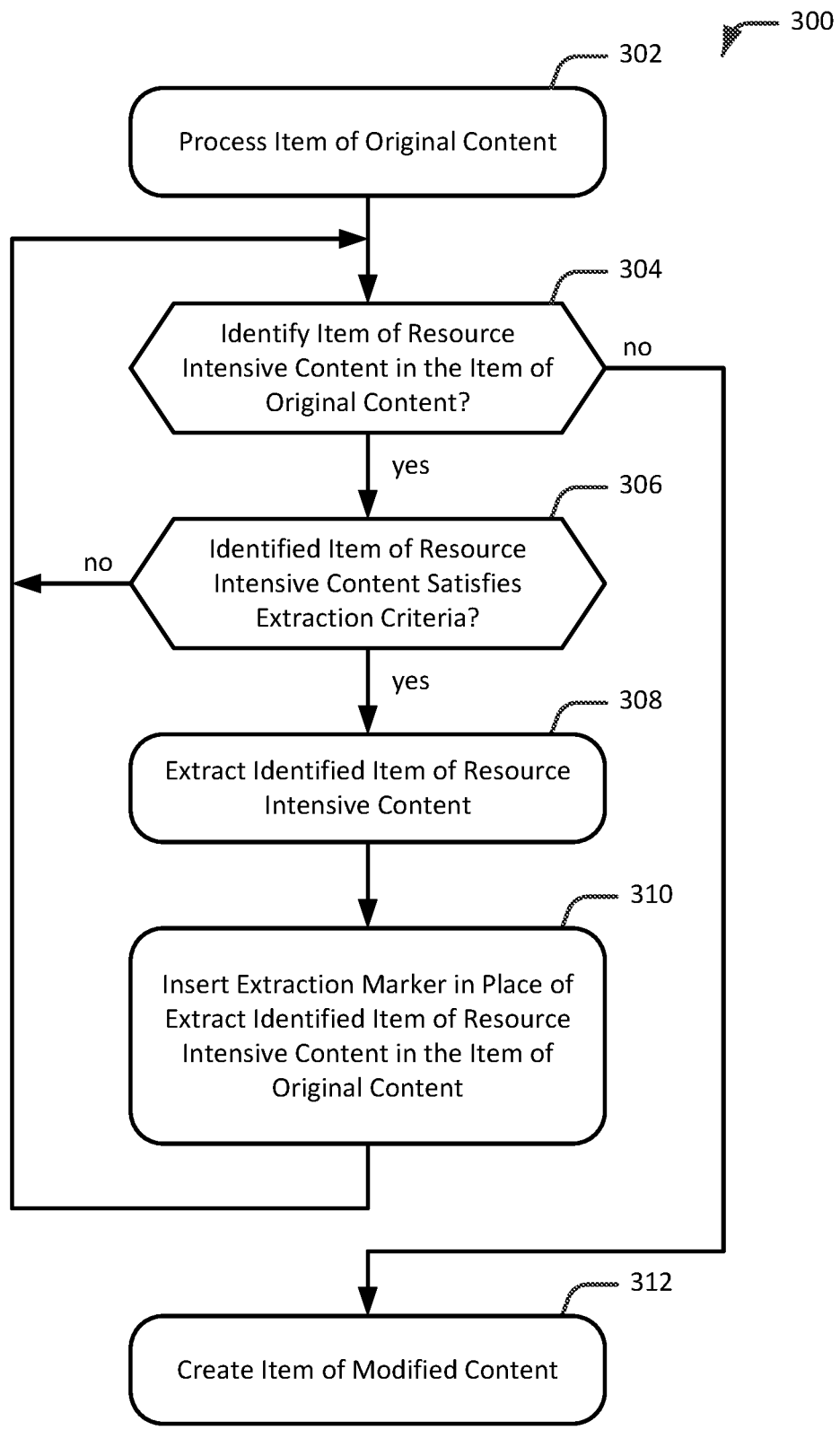
FIG. 3 is a flow diagram that illustrates an example process to extract an item of resource intensive content from an item of original content, in accordance with at least some embodiments described herein.
Figure 4:
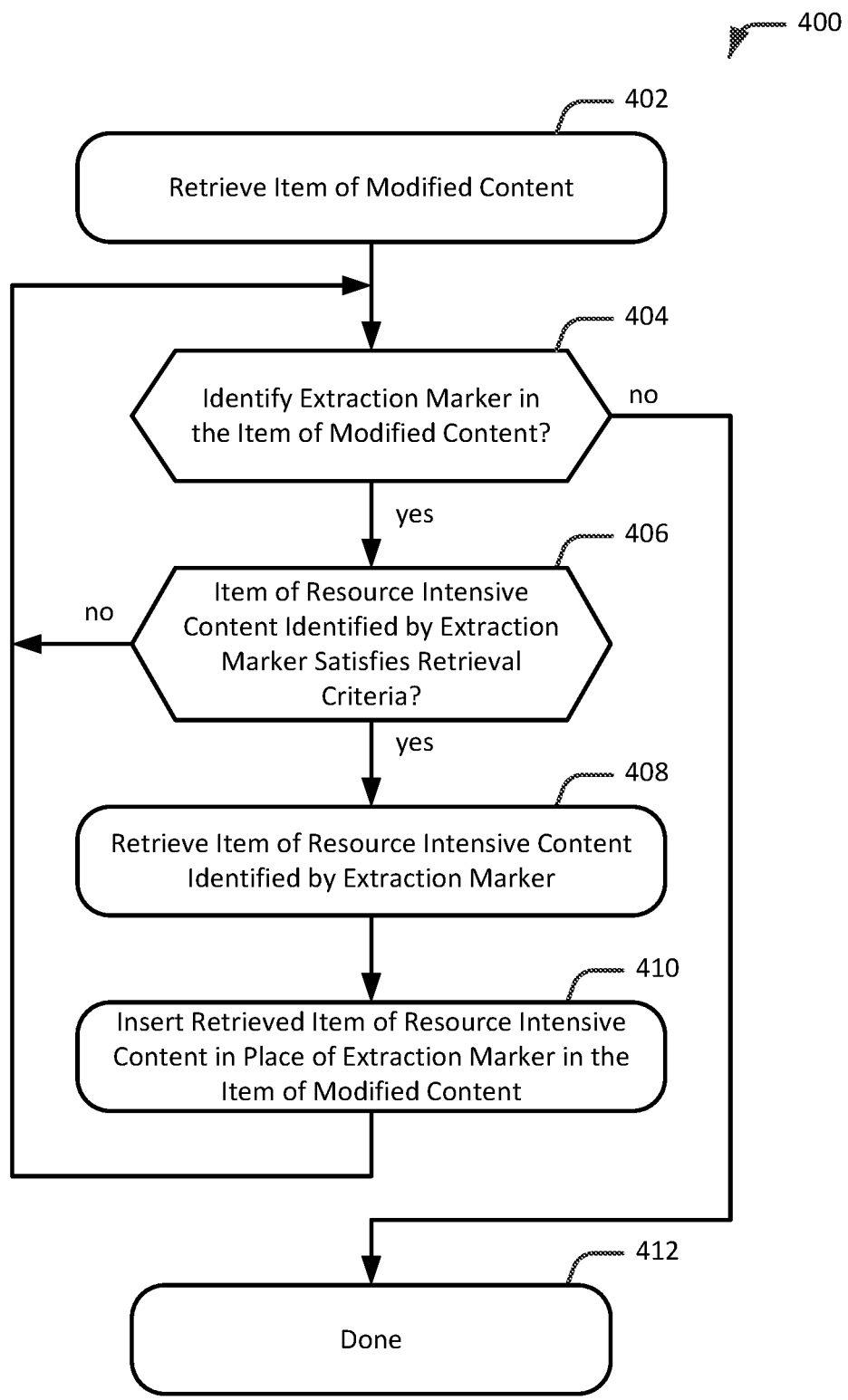
FIG. 4 is a flow diagram that illustrates an example process to retrieve an item of extracted resource intensive content for insertion into an item of modified content, in accordance with at least some embodiments described herein.

FIG. 3 is a flow diagram 300 that illustrates an example process to extract an item of resource intensive content from an item of original content, in accordance with at least some embodiments described herein. FIG. 4 is a flow diagram 400 that illustrates an example process to retrieve an item of extracted resource intensive content for insertion into an item of modified content, in accordance with at least some embodiments described herein. The operations, functions, or actions illustrated in the example processes of flow diagrams 300 and 400 may in some embodiments be performed by client-server content distribution system 100 and, more particularly, server computing system 102 and user computing system 104 of FIG. 1. The operations, functions, or actions described in the respective blocks of the example processes of flow diagrams 300 and 400 may also be stored as computer-executable instructions in a computer-readable medium, such as memory 118 and/or data storage 116 of server computing system 102, and memory 120 and data storage 128 of user computing system 104.

Those skilled in the art will appreciate that, for this and other processes and methods disclosed herein, the functions performed in the processes and methods may be implemented in differing order. Additionally or alternatively, two or more operations may be performed at the same time. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 3, the process may begin with block 302, where content analysis module 112 processes an item of original content. For example, the item of original content may include mixed content. In some cases, the item of original content may have access controls associated therewith.

Block 302 may be followed by decision block 304, where content analysis module 112 analyzes the item of original content for resource intensive content that has yet to be processed by content analysis module 112. If content analysis module 112 does not identify an item of resource intensive content that requires processing (e.g., all items of resource intensive content included in the item of original content have been processed, or the item of original content does not include any resource intensive content), decision block 304 may be followed by block 312, where extraction module 114 creates an item of modified content that corresponds to the item of original content.

Otherwise, if content analysis module 112 identifies an item of resource intensive content that requires processing, decision block 304 may be followed by decision block 306, where content analysis module 112 checks to determine whether the identified item of resource intensive content satisfies the extraction criteria that are being applied. If content analysis module 112 determines that the identified item of resource intensive content does not satisfy the extraction criteria that are being applied, decision block 306 may be followed by decision block 304, where content analysis module 112 continues the analysis of the item of original content for resource intensive content that has yet to be processed by content analysis module 112.

Otherwise, if content analysis module 112 determines that the identified item of resource intensive content satisfies the extraction criteria that are being applied, decision block 306 may be followed by block 308, where content analysis module 112 creates an extraction marker that identifies the item of resource intensive content that is to be extracted. The extraction marker also serves to indicate that the identified item of resource intensive content is to be extracted. In some embodiments, the extraction marker may indicate that a portion of the identified item of resource intensive content is to be extracted. In some embodiments, content analysis module 122 creates multiple extractions markers to identify multiple segments or portions of the item of resource intensive content.

Block 308 may be followed by block 310, where extraction module 114 extracts from the item of original content the item of resource intensive content identified by the extraction marker. Extraction module 114 inserts the extraction marker into the location where the item of resource intensive content was extracted in the item of original content. Extraction module 114 creates an item of child content from the extracted item of resource intensive content.

Block 310 may be followed by decision block 304, where content analysis module 112 analyzes the item of original content for resource intensive content that has yet to be processed by content analysis module 112. In this manner, the items of resource intensive content included in an item of original content are processed for possible extraction to reduce the latency in the rendering of the item of original content.

With reference to FIG. 4, the process may begin with block 402, where rendering decision module 124 retrieves an item of modified content from server computing system 102. For example, a user may be utilizing user computing system 104 to access server computing system 102. Using rendering module 122, the user may have made a request to access an item of original content, which results in rendering decision module 124 retrieving the item of modified content that corresponds to the requested item of original content. Rendering decision module 124 may provide the retrieved modified content to rendering module 122 for rendering to the user.

Block 402 may be followed by decision block 404, where rendering decision module 124 analyzes the item of modified content for extraction markers to process. If rendering decision module 124 does not identify an extraction marker that requires processing (e.g., all extraction markers included in the item of modified content have been processed), decision block 404 may be followed by block 412, where processing of the retrieved item of modified content for retrieval of extracted items of resource intensive content identified by extraction markers included in the item of modified content may complete.

Otherwise, if rendering decision module 124 identifies an extraction marker that requires processing, decision block 404 may be followed by decision block 406, where rendering decision module 124 checks to determine whether the item of resource intensive content (the item of child content) identified by the identified extraction marker satisfies the retrieval criteria that are being applied. If rendering decision module 124 determines that the retrieval criteria that are being applied are not satisfied, decision block 406 may be followed by decision block 404, where rendering decision module 124 continues the analysis of the item of modified content for extraction markers to process.

Otherwise, if rendering decision module 124 determines that the retrieval criteria that are being applied are satisfied, decision block 406 may be followed by block 408, where rendering decision module 124 flags the identified extraction marker for retrieval. Rendering decision module 124 provides asynchronous retrieval module 126 the flagged extraction marker.

Block 408 may be followed by block 410, where asynchronous retrieval module 126 retrieves from content repository 202 the item of extracted resource intensive content identified by the flagged extraction marker. Asynchronous retrieval module 126 inserts the retrieved item of resource intensive content into the item of modified content in a manner as to replace the flagged extraction marker in the item of modified content.

Block 410 may be followed by decision block 404, where rendering decision module 124 analyzes the item of modified content for extraction markers to process. In this manner, the extraction markers included in an item of modified content are processed to create the item of original content that corresponds to the item of modified content.

As indicated above, the embodiments described in the present disclosure may include the use of a special purpose or a general purpose computer (e.g., processor 108 and processor 118 of FIG. 1) including various computer hardware or software modules, as discussed in greater detail herein. Further, as indicated above, embodiments described in the present disclosure may be implemented using computer-readable media (e.g., memory 110 and memory 120 of FIG. 1) for carrying or having computer-executable instructions or data structures stored thereon.

In some embodiments, virtualization may be employed in server computing system 102 and user computing system 104 so that infrastructure and resources in server computing system 102 and user computing system 104 may be shared dynamically. For example, a virtual machine may be provided to handle a process running on multiple processors so that the process appears to be using only one computing resource rather than multiple computing resources. Multiple virtual machines may also be used with one processor.

Numerous example variations and configurations will be apparent in light of this disclosure. According to some examples, computer-implemented methods to automatically extract an item of resource intensive content from an item of original content are described. An example computer-implemented method may include: identifying an item of resource intensive content included in an item of original content; determining whether the identified item of resource intensive content satisfies a first criteria; and responsive to a determination that the identified item of resource intensive content satisfies the first criteria, extracting the identified item of resource intensive content from the item of original content, and inserting an extraction marker in a location within the item of original content from which the identified item of resource intensive content was extracted to create an item of modified content, the item of modified content corresponding to the item of original content, the extraction marker indicating that the identified item of resource intensive content has been extracted from the item of original content.

In some examples, the extraction marker comprises a globally unique identifier (GUID) and associated metadata, the GUID identifying the extracted item of resource intensive content, and the associated metadata specifying one or more characteristics of the extracted item of resource intensive content. In other examples, the one or more characteristics include an indication of a size of the extracted item of resource intensive content. In further examples, the one or more characteristics include an indication of a dimension of the extracted item of resource intensive content. In yet other examples, the one or more characteristics include an indication of a content type of the extracted item of resource intensive content.

In some examples, the first criteria includes a size threshold. In other examples, determining whether the identified item of resource intensive content satisfies the first criteria comprises determining whether the identified item of resource intensive content has a size that is equal to or larger than the size threshold. In still other examples, the first criteria includes a usage threshold. In further examples, determining whether the identified item of resource intensive content satisfies the first criteria comprises determining whether the identified item of resource intensive content has a usage that is equal to or smaller than the usage threshold. In some examples, the item of resource intensive content includes an image. In other examples, the item of resource intensive content includes a video. In still other examples, the item of resource intensive content includes extended text. In yet other examples, the item of original content includes access controlled original content.

According to some examples, computer program products including one or more non-transitory machine readable mediums encoded with instructions that when executed by one or more processors cause a process to be carried out to automatically extract an item of resource intensive content from an item of original content are described. An example process may include: identifying an item of resource intensive content included in an item of original content; determining whether the identified item of resource intensive content satisfies a first criteria; and responsive to a determination that the identified item of resource intensive content satisfies the first criteria, extracting the identified item of resource intensive content from the item of original content, and inserting an extraction marker in a location within the item of original content from which the identified item of resource intensive content was extracted to create an item of modified content, the item of modified content corresponding to the item of original content, the extraction marker indicating that the identified item of resource intensive content has been extracted from the item of original content.

In some examples, the extraction marker comprises a globally unique identifier (GUID) and associated metadata, the GUID identifying the extracted item of resource intensive content, and the associated metadata specifying one or more characteristics of the extracted item of resource intensive content. In other examples, the one or more characteristics includes one or more of an indication of a size of the extracted item of resource intensive content, an indication of a dimension of the extracted item of resource intensive content, and an indication of a content type of the extracted item of resource intensive content. In still other examples, the first criteria includes one or more of a size threshold and a usage threshold. In yet other examples, determining whether the identified item of resource intensive content satisfies the first criteria comprises determining whether the identified item of resource intensive content has a size that is equal to or larger than the size threshold. In further examples, determining whether the identified item of resource intensive content satisfies the first criteria comprises determining whether the identified item of resource intensive content has a usage that is equal to or smaller than the usage threshold. In yet further examples, the item of resource intensive content includes one or more of an image, a video, and extended text. In some examples, the item of original content includes access controlled original content.

According to other examples, systems to automatically extract an item of resource intensive content from an item of original content are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: identify an item of resource intensive content included in an item of original content; determine whether the identified item of resource intensive content satisfies a first criteria; and responsive to a determination that the identified item of resource intensive content satisfies the first criteria, extract the identified item of resource intensive content from the item of original content, and insert an extraction marker in a location within the item of original content from which the identified item of resource intensive content was extracted to create an item of modified content, the item of modified content corresponding to the item of original content, the extraction marker being an indicator that the identified item of resource intensive content has been extracted from the item of original content.

In some examples, the extraction marker comprises a globally unique identifier (GUID) and associated metadata, the GUID identifying the extracted item of resource intensive content, and the associated metadata specifying one or more characteristics of the extracted item of resource intensive content. In other examples, the one or more characteristics includes one or more of an indication of a size of the extracted item of resource intensive content, an indication of a dimension of the extracted item of resource intensive content, and an indication of a content type of the extracted item of resource intensive content. In still other examples, the first criteria includes one or more of a size threshold and a usage threshold. In yet other examples, determining whether the identified item of resource intensive content satisfies the first criteria comprises determining whether the identified item of resource intensive content has a size that is equal to or larger than the size threshold. In further examples, determining whether the identified item of resource intensive content satisfies the first criteria comprises determining whether the identified item of resource intensive content has a usage that is equal to or smaller than the usage threshold. In still further examples, the item of resource intensive content includes one or more of an image, a video, and extended text. In yet further examples, the item of original content includes access controlled original content.

According to some examples, computer-implemented methods to automatically retrieve an item of resource intensive content extracted from an item of original content are described. An example computer-implemented method may include: receiving an item of modified content, the item of modified content corresponding to an item of original content, the item of modified content including an extraction marker, the extraction marker indicating that an item of resource intensive content has been extracted from the item of original content; determining whether to retrieve the extracted item of resource intensive content; and responsive to a determination to retrieve the extracted item of resource intensive content, retrieving the extracted item of resource intensive content, and inserting the retrieved extracted item of resource intensive content in a location within the item of modified content in which the extraction marker is located.

In some examples, determining whether to retrieve the extracted item of resource intensive content is based on information included in the extraction marker. In other examples, determining whether to retrieve the extracted item of resource intensive content is based on a characteristic of the extracted item of resource intensive content. In still other examples, the characteristic includes a size of the extracted item of resource intensive content. In further examples, determining whether to retrieve the extracted item of resource intensive content is based on whether the extracted item of resource intensive content will be visible if displayed on a display screen. In yet other examples, determining whether to retrieve the extracted item of resource intensive content is based on an analytic metric associated with the extracted item of resource intensive content. In other examples, the analytic metric includes a usage metric.

According to some examples, computer program products including one or more non-transitory machine readable mediums encoded with instructions that when executed by one or more processors cause a process to be carried out to automatically retrieve an item of resource intensive content extracted from an item of original content are described. An example process may include: receiving an item of modified content, the item of modified content corresponding to an item of original content, the item of modified content including an extraction marker, the extraction marker indicating that an item of resource intensive content has been extracted from the item of original content; determining whether to retrieve the extracted item of resource intensive content; and responsive to a determination to retrieve the extracted item of resource intensive content, retrieving the extracted item of resource intensive content, and inserting the retrieved extracted item of resource intensive content in a location within the item of modified content in which the extraction marker is located.

In some examples, determining whether to retrieve the extracted item of resource intensive content is based on one or more of information included in the extraction marker, a characteristic of the extracted item of resource intensive content, whether the extracted item of resource intensive content will be visible if displayed on a display screen, and an analytic metric associated with the extracted item of resource intensive content. In other examples, the characteristic includes a size of the extracted item of resource intensive content. In still other examples, the analytic metric includes a usage metric.

According to other examples, systems to automatically retrieve an item of resource intensive content extracted from an item of original content are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: receive an item of modified content, the item of modified content corresponding to an item of original content, the item of modified content including an extraction marker, the extraction marker being an indicator that an item of resource intensive content has been extracted from the item of original content; determine whether to retrieve the extracted item of resource intensive content; and responsive to a determination to retrieve the extracted item of resource intensive content, retrieve the extracted item of resource intensive content, and insert the retrieved extracted item of resource intensive content in a location within the item of modified content in which the extraction marker is located.

In some examples, determining whether to retrieve the extracted item of resource intensive content is based on one or more of information included in the extraction marker, a characteristic of the extracted item of resource intensive content, whether the extracted item of resource intensive content will be visible if displayed on a display screen, and an analytic metric associated with the extracted item of resource intensive content. In other examples, the characteristic includes a size of the extracted item of resource intensive content. In still other examples, the analytic metric includes a usage metric.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A computer-implemented method comprising:
identifying an item of resource intensive content included in an item of original content;
determining whether the identified item of resource intensive content satisfies a size threshold; and
responsive to a determination that the identified item of resource intensive content satisfies the size threshold:
creating an extraction marker indicating that the identified item of resource intensive content is to be extracted from a location within the item of original content;
extracting the identified item of resource intensive content indicated by the extraction marker from the location within the item of original content; and
inserting the extraction marker at the location within the item of original content from which the identified item of resource intensive content indicated by the extraction marker was extracted to create an item of modified content, the item of modified content corresponding to the item of original content, the extraction marker further indicating that the identified item of resource intensive content has been extracted from the item of original content.

2. The method of claim 1, wherein the extraction marker comprises a globally unique identifier (GUID) identifying the extracted item of resource intensive content and associated metadata specifying one or more characteristics of the extracted item of resource intensive content.

3. The method of claim 2, wherein the one or more characteristics include one or more of an indication of a size of the extracted item of resource intensive content, an indication of a dimension of the extracted item of resource intensive content, and an indication of a content type of the extracted item of resource intensive content.

4. The method of claim 1, further comprising, responsive to the determination, saving the item of modified content and the identified item of resource intensive content as separate items in a content repository.

5. The method of claim 1, wherein determining whether the identified item of resource intensive content satisfies the size threshold comprises determining whether the identified item of resource intensive content has a size that is equal to or larger than the size threshold.

6. The method of claim 1, further comprising determining whether the identified item of resource intensive content satisfies a usage threshold, wherein extracting the identified item of resource intensive content and inserting the extraction marker are performed in response to a determination that the identified item of resource intensive content satisfies the size threshold and the usage threshold.

7. The method of claim 6, wherein determining whether the identified item of resource intensive content satisfies the comprises determining whether the identified item of resource intensive content has a usage that is equal to or smaller than the usage threshold.

8. The method of claim 1, wherein the item of resource intensive content includes one or more of an image, a video, and extended text.

9. The method of claim 1, wherein the item of original content includes access controlled original content.

10. A computer-implemented method comprising:
receiving an item of modified content, the item of modified content corresponding to an item of original content, the item of modified content including an extraction marker, the extraction marker indicating that an item of resource intensive content has been extracted from the item of original content;
determining whether to retrieve the extracted item of resource intensive content based on one or more of a globally unique identifier (GUID) identifying the extracted item of resource intensive content, a size or dimension of the extracted item of resource intensive content, whether the extracted item of resource intensive content will be visible if displayed on a display screen, and an analytic metric associated with the extracted item of resource intensive content; and
responsive to a determination to retrieve the extracted item of resource intensive content:
retrieving the extracted item of resource intensive content; and
inserting the retrieved extracted item of resource intensive content in a location within the item of modified content in which the extraction marker is located.

11. The method of claim 10, wherein the size of the extracted item of resource intensive content depends on a type of content that comprises the extracted item of resource intensive content.

12. The method of claim 10, wherein the determining whether to retrieve the extracted item of resource intensive content is further based on type of content that comprises the extracted item of resource intensive content.

13. The method of claim 10, wherein the analytic metric includes a usage metric.

14. A computer program product including one or more non-transitory machine readable mediums encoded with instructions that when executed by one or more processors cause a process to be carried out to automatically extract an item of resource intensive content from an item of original content, the process comprising:
identifying an item of resource intensive content included in an item of original content;
determining whether the identified item of resource intensive content satisfies a first criteria; and
responsive to a determination that the identified item of resource intensive content satisfies the first criteria:
creating an extraction marker indicating that the identified item of resource intensive content is to be extracted from a location within the item of original content;
extracting the identified item of resource intensive content indicated by the extraction marker from the location within the item of original content;
inserting the extraction marker at the location within the item of original content from which the identified item of resource intensive content indicated by the extraction marker was extracted to create an item of modified content, the item of modified content corresponding to the item of original content, the extraction marker further indicating that the identified item of resource intensive content has been extracted from the item of original content; and saving the item of modified content and the identified item of resource intensive content as separate items in a content repository.

15. The computer program product of claim 14, wherein the extraction marker comprises a globally unique identifier (GUID) identifying the extracted item of resource intensive content and associated metadata specifying one or more characteristics of the extracted item of resource intensive content.

16. The computer program product of claim 15, wherein the one or more characteristics includes one or more of an indication of a size of the extracted item of resource intensive content, an indication of a dimension of the extracted item of resource intensive content, and an indication of a content type of the extracted item of resource intensive content.

17. The computer program product of claim 14, wherein the first criteria includes a size threshold.

18. The computer program product of claim 17, wherein determining whether the identified item of resource intensive content satisfies the first criteria comprises determining whether the identified item of resource intensive content has a size that is equal to or larger than the size threshold.

19. The computer program product of claim 14, wherein the first criteria includes a usage threshold.

20. The computer program product of claim 19, wherein determining whether the identified item of resource intensive content satisfies the first criteria comprises determining whether the identified item of resource intensive content has a usage that is equal to or smaller than the usage threshold.

* * * * *